United States Patent
Kanno et al.

[19]

[11] Patent Number: 5,878,829
[45] Date of Patent: Mar. 9, 1999

[54] MANUAL ELECTRIC WHEELCHAIR

[75] Inventors: Nobuyuki Kanno; Hiroshi Tanaka, both of Iwata, Japan

[73] Assignee: Yamaha Hatsudoki Kabushiki Kaisha, Iwata, Japan

[21] Appl. No.: 793,623

[22] PCT Filed: Jun. 20, 1996

[86] PCT No.: PCT/JP96/01703

§ 371 Date: May 15, 1997

§ 102(e) Date: May 15, 1997

[87] PCT Pub. No.: WO97/00658

PCT Pub. Date: Sep. 1, 1997

[30] Foreign Application Priority Data

Jun. 20, 1995 [JP] Japan .................................. 7-153499

[51] Int. Cl.⁶ .................................................. B60K 7/00
[52] U.S. Cl. .......................................... 180/65.5; 180/907
[58] Field of Search .................... 180/907, 6.48, 180/6.5, 65.1, 65.2, 65.5

[56] References Cited

U.S. PATENT DOCUMENTS

| | | | |
|---|---|---|---|
| 4,021,690 | 5/1977 | Burton | 310/67 R |
| 4,062,421 | 12/1977 | Weber | 180/65.2 |
| 4,671,524 | 6/1987 | Haubenwallner | 280/212 |
| 4,773,495 | 9/1988 | Haubenwallner | 180/65.2 |
| 5,199,520 | 4/1993 | Chen | 180/65.5 |
| 5,222,567 | 6/1993 | Broadhead et al. | 180/15 |
| 5,234,066 | 8/1993 | Ahsing et al. | 180/6.5 |
| 5,246,082 | 9/1993 | Alber | 180/65.5 |
| 5,366,037 | 11/1994 | Richey | 180/65.5 |
| 5,427,193 | 6/1995 | Avakian | 180/65.5 |
| 5,450,915 | 9/1995 | Li | 180/65.5 |
| 5,555,949 | 9/1996 | Stallard et al. | 180/6.5 |
| 5,556,121 | 9/1996 | Pillot | 280/304.1 |
| 5,648,708 | 7/1997 | Littlejohn | 318/488 |
| 5,755,304 | 5/1998 | Trigg et al. | 180/65.5 |

*Primary Examiner*—Richard M. Camby
*Assistant Examiner*—Bridget Avery
*Attorney, Agent, or Firm*—KNobbe, Martens, Olson Bear LLP

[57] ABSTRACT

According to the present invention, in a manual electric wheelchair equipped with a supplemental drive force system consisting of a man power detect means constituted by a potentiometer (27), etc., a signal transmit means constituted by a rotation transformer (39), a control means constituted by a controller (35), a drive force transmit means constituted by a drive motor and gears (G1–G4), etc., a set consisting of the man power detect means, the signal transmit means, the control means, the drive motor, and the drive force transmit means is arranged about an axle (11) of the hub (2a) and of the stationary plate (31) of each drive wheel (2), the stationary plate (31) being fixed to a frame (3) at a location in the vicinity of the hub (2a) in a manner such that the stationary plate (31) is prohibited from rotating, and each drive wheel (2) is capable of being attached to and detached from the chair body together with the respective stationary plate (31). Therefore, according to the present invention, a compact and rational arrangement of the supplemental drive force system is realized, and a mass producibility is improved through the consequent reduction in number and lengths of the wires as well as simplification of manufacture and assemble work of the manual electric wheelchair.

16 Claims, 12 Drawing Sheets

MANUAL ELECTRIC WHEELCHAIR

[FIELD OF THE ART]

This invention relates to a manual electric wheelchair which is designed such that a pair of right and left drive wheels are driven to rotate as supplementary drive force of a magnitude corresponding to a human force imparted by hands to the drive wheels is transmitted to the drive wheels.

[BACKGROUND ART]

This manual electric wheelchair is a crossbreed of the conventional manual wheelchair and the electric wheelchair, and is designed to mitigate the physical work of a rider through the following procedure: detecting a man power imparted intermittently to a pair of right and left drive wheels by a man power detect means; transmitting a detection signal to a control means through a signal transmit means; causing a drive motor, which is controlled by the control means, to create a supplemental force of a magnitude corresponding to the man power; and transmitting this supplemental force to the right and left drive wheels through a drive force transmit means.

However, with the conventional manual electric wheelchairs, the design adopted for the arrangement of the man power detect means, the signal transmit means, the control means; the drive motor and the drive force transmit means, which constitute a supplemental drive force system, was not the kind wherein these elements are assembled at one place compactly, so that the wires used were numerous and lengthy and the manufacture and assemble work was not easy and the cost was high.

Also, with the conventional manual electric wheelchairs, such construction was not adopted whereby the supplemental drive force system is provided for each drive wheel independently from the chair body, so that it was not easy to detach the drive wheels from the chair body, and hence lacked portability and easiness of storing.

It is therefore an object of the invention to provide a manual electric wheelchair, with which a cost reduction can be achieved through simplification of manufacture and assemble work on account of reduction in number and lengths of the wires resulting from realization of compact and rational arrangement of the supplemental drive force system, and with which wheelchair it becomes highly portable and storable on account of easy detachability of the drive wheels from the chair body.

Incidentally, in the conventional manual electric wheelchairs, since the supplemental drive force system consisted of two symmetrically arranged units each one provided radially outside the periphery of each drive wheel, the bulk of the wheelchair was so large that it was not only difficult to handle it but also troublesome to fold it up when not in use.

It is therefore another object of the invention to provide a manual electric wheelchair, which can be made more compact through effectual utilization of its unoccupied room and which can be made more storable while the effect of mass production is increased.

Now, conventionally, the man power detect means adopted was such as follows: handrims were supported in a manner such that they were freely rotatable relative to the drive wheels, and an elastic means such as a spring is connected between a handrim and a drive wheel, and a relative rotation amount of the handrim, which increases proportionately to the man power imparted to the handrim, is detected with a potentiometer or the like to thereby detect the man power.

However, with the conventional manual electric wheelchairs which adopted the man power detect means as described above, since the handrims were supported freely rotatably by a wheel axle of a small-diameter, so that the rigidity with which the handrim is supported is low and thus it was possible that a rider fails to properly perform the lift-up action (an action performed by a rider to lift his/her body making use of the handrims as the support when mounting and dismounting).

Therefore, it is still another object of the invention to provide a manual electric wheelchair, wherein the handrims are supported by drive wheel hubs which can be machined with high precision and have high rigidity, so that the handrims can be supported with higher rigidity and it is also possible for the handrims to rotate smoothly and for the rider to perform the lift-up action by means of the handrims.

Also, when the offset amount in the direction of the axle (widthwise direction of the wheelchair) between an operation portion of the handrims (the portion by which the rider holds the handrims) and a rotation support portion thereof is large, that moment which works upon the handrims in the lateral direction (the moment which works in such a direction as to bend the handrims sideways with respect to the rotation support portion) becomes large with a result that the sideways play of the handrims increases so that the operability is impaired and the durability of the bearing provided in the rotation support portion is lowered.

Therefore, it is still another object of the invention to provide a manual electric wheelchair, with which the operability of the handrims can be improved through reduction of the sideways play of the handrims, and in which the durability of the bearing of the rotation support portion of the handrims can be improved.

Incidentally, it is necessary to maintain with stability the precision of the man power detect means, which consists of springs, potentiometer, etc., for example, so that this means is required to be highly waterproof and dustproof.

Therefore, it is a further object of the invention to provide a manual electric wheelchair, with which it is possible to maintain the detection precision of the man power detect means at high level stably.

The conventional manual electric wheelchairs still had another problem: since the construction was such that the drive wheels were not easily attached to or detached from the chair body, the wheelchairs were poor in portability and storability.

It is therefore a further object of the invention to provide a manual electric wheelchair, with which it is possible to detach and attach the drive wheels in a one-click manner so easily that the portability and storability are significantly improved.

Now, a battery is indispensable as the electric power source to a manual electric wheelchair, and electricity is supplied from the battery to the drive motor and the control means; then, if a main switch for connecting and disconnecting the battery is integrally incorporated in a drive wheel and the main switch is made detachable from the chair body together with the drive wheel in which it is incorporated, the electric wire connecting the main switch to the battery can be made shorter and more manageable, and at the same time, the drive wheels are easily detached from and attached to the chair body.

Therefore, it is also an object of the invention to provide a manual electric wheelchair, with which it is possible to simplify the overall construction and ease the operation for detaching the drive wheels from and attaching the same to the chair body through dwarfing of the electric wires and wire accessories.

[DISCLOSURE OF THE INVENTION]

In order to attain the above objects, the invention of claim 1 characterizes a manual electric wheelchair wherein a man power imparted to a pair of drive wheels is detected by means of a man power detect means, and a detection signal representing the man power is transmitted to a control means through a signal transmit means, and a drive motor, which is controlled by the control means, is caused to create a supplemental force of a magnitude corresponding to the man power, and this supplemental force is transmitted to the drive wheels through a drive force transmit means; by that a set consisting of the man power detect means, the signal transmit means, the control means, the drive motor, and the drive force transmit means is arranged about an axle of the hub and of the stationary plate of each drive wheel, the stationary plate being fixed to a frame at a location in the vicinity of the hub in a manner such that the stationary plate is prohibited from rotating; and by that each drive wheel is capable of being attached to and detached from the chair body together with the respective stationary plate.

The invention of claim 2 is characterized over the invention of claim 1 in that each axle is made capable of being attached to and detached from the chair body together with the respective drive wheel and stationary plate.

The invention of claim 3 is characterized over the invention of claim 1 or 2 in that the drive motor and control means are provided to the stationary plate and that the man power detect means is provided on the same side as the hub of the drive wheel.

The invention of claim 4 is characterized over the invention of claim 3 in that the stationary plate and the drive motor and control means which are provided to the stationary plate are provided at locations between the wheels, and that the man power detect means is provided at a location external to the respective wheels.

The invention of claim 5 is characterized over the invention of claim 3 or 4 in that a partition wall is provided between the control means provided to the stationary plate and the man power detect means provided on the same side as the hub of the respective drive wheel.

The invention of claim 6 is characterized over the invention of any of claims 1 through 4 or claim 5 in that the signal transmit means is provided about the axis of the hub of each drive wheel, and that the control means and drive motor and drive force transmit means are provided at locations axially outward to the signal transmit means.

The invention of claim 7 is characterized over the invention of any of claims 1 through 5 or claim 6 in that a pair of right and left drive wheels having the same construction are provided in such a positional relationship that the two wheels are symmetrical with respect to a middle point of the chair body as taken in the direction of front to rear.

The invention of claim 8 is characterized over the invention of any of claims 1 through 6 or claim 7 in that man power is imparted to the respective drive wheels via handrims, and that the handrims are supported by the hubs of the respective drive wheels in a manner such that the handrims are freely rotative.

The invention of claim 9 is characterized over the invention of claim 8 in that each one of the handrims is attached to handrim support member supported freely rotatively on the hub of the respective drive wheel and that the handrim support member is provided outside the outer wall of the respective hub.

The invention of claim 10 is characterized over the invention of claim 9 in that a resilient member is provided between the handrim support member and an outer wall face of the hub of the respective drive wheel, that a space is defined between the handrim support member and the outer wall face of the respective hub, and that the man power detect means is stored in the defined space.

The invention of claim 11 is characterized over the invention of claim 9 or 10 in that the drive wheels are capable of being attached to and detached from the chair body, that a cover member is disposed outside the respective handrim support member, that a flexible cap member is fitted in a radially central portion of the cover member and is used as an operation button for the attachment and detachment of the respective drive wheel.

The invention of claim 12 is characterized over the invention of any of claims 1 through 10 or claim 11 in that a battery is installed on the stationary plate of one of the drive wheels, and that supply of electricity from the battery to the other drive wheel is conducted through a wire harness.

The invention of claim 13 is characterized over the invention of claim 12 in that a main switch for connecting and disconnecting the electricity supply from the battery to the respective drive wheels is integrally built in at least one of the drive wheels.

The invention of claim 14 is characterized over the invention of claim 13 in that a switch lever for driving the main switch is integrally built in at least one of the drive wheels together with the main switch.

The invention of claim 15 is characterized over the invention of claim 14 in that the switch lever is constructed such that its length and direction are adjustable.

The invention of claim 16 is characterized over the invention of claim 14 or 15 in that an indicator means is provided at the fore end portion of the switch lever.

Therefore, according to the invention of claim 1, the man power detect means, the signal transmit means, the control means, the drive motor, and the drive force transmit means constituting the supplemental drive force system are concentratedly arranged about the axle of the hub and of the stationary plate of each drive wheel, so that a compact and rational arrangement of the supplemental drive force system was realized and a reduction in the manufacturing cost of the manual electric wheelchair was achieved through simplification of manufacture and assemble work on account of the consequent reduction in number and lengths of the wires. Furthermore, the wheels, in which the supplementary drive system is compactly arranged, are attachable to and detachable from the wheel body, together with the stationary plate, so that when the manual electric wheelchair is transported or stored, the wheels can be easily removed from the chair body, together with the stationary plate and the supplemental drive force system, and, therefore, the portability and storability of the manual electric wheelchair 1 was improved.

According to the invention of claim 2, each axle is also made capable of being attached to and detached from the chair body together with the respective drive wheel and the stationary plate, so that the portability and storability of the manual electric wheelchair was improved.

According to the invention of claim 3 or claim 4, while the drive motor and the control means are provided on the stationary side, the man power detect means is provided on the rotatory side, so that a more rational arrangement of these elements was realized and a high space effectiveness of each wheel was secured.

According to the invention of claim 5, the control means provided on the stationary side and the man power detect means provided on the rotatory side are isolated from each other by the partition wall, so that it is possible to prevent water, lubricant, dust, etc. from entering the the control means and the man power detect means, and to secure high operational stability of these.

According to the invention of claim 6, in each drive wheel, the signal transmit means, the control means, the drive motor and the drive force transmit means are arranged in the radial direction, so that it is possible to utilize the room in each wheel more effectively.

According to the invention of claim 7, the right and left drive wheels, each equipped with the supplemental drive force system, have the same construction, so that the mass-producibility of the manual electric wheelchair was improved. Furthermore, the right and left drive wheels are provided in such a positional relationship that the two wheels are symmetrical with respect to a middle point of the chair body as taken in the direction of front to rear, so that in the arrangement of the supplemental drive force systems of the manual electric wheelchair as a whole could be such that the effective use of the room space is facilitated, and then the size of the manual electric wheelchair can be reduced and the handling of the manual electric wheelchair can be easier and, for example, when the manual electric wheelchair is folded the right and left supplemental drive force systems do not interfere with each other, and the storability of the manual electric wheelchair is improved.

According to the invention of claim 8, each handrim is supported by the hub, which is made of a material capable of being machined with high precision and h a high rigidity, the handrims are supported with a high rigidity and their smooth rotation is facilitated, and also it is possible for the rider to stably perform the lift-up action by means of the handrims.

According to the invention of claim 9, each one of the handrims is attached to handrim support member supported freely rotatively on the hub of the respective drive wheel and the handrim support member is provided outside the outer wall of the respective hub, it is now possible to minimize the offset amount in the direction of the axle (widthwise direction of the wheelchair) between the operation portion and the rotation support portion of the handrim; and as the result, it is possible to minimize the sideways play of the handrim, which in effect facilitates the operability of the handrim and improves the durability of the bearing of the rotation support portion of the handrim.

According to the invention of claim 10, the man power detect means is stored in the highly water-proof and dust-proof space defined between the handrim support member and the outer wall face of the hub, so that it is possible to prevent water, dust, etc. from entering the man power detect means, and thus it is possible to secure high stability in the detection precision of the man power detect means. What is more, besides as a sealing means, the resilient member provided between the handrim support member and the outer wall face of the hub of the respective drive wheel, functions as a friction damper to restrict the vibration caused by the inertia of the handrim, so that it is possible to avoid creation of error signals ascribable to the vibration.

According to the invention of claim 11, by operating the flexible cap member as the operation button, it is possible to attach the wheels to the chair body as well as to detach the same therefrom easily in a one-click manner, so that during transportation or storing of the manual electric wheelchair, by detaching the wheels from the chair body, the portability and storability of the manual electric wheelchair 1 is improved.

According to the invention of claim 12, the battery is installed on the stationary plate of one of the drive wheels, and the electricity supply from the battery to the other drive wheel is conducted through a wire harness, so that the chair body need only be provided with the wire harness and, in some cases, the main switch, and thus the construction of the chair body is simplified.

According to the invention of claim 13 or 14, the electric wire connecting the main switch with the battery does no show up on the chair body frame, so that the quantities of the electric wiring and parts incidental to this can be minimized, which facilitates simplification of the construction and improves easiness with which the wheels are attached to and detached from the chair body.

According to the invention of claim 15, the switch lever is constructed such that its length and direction are adjustable so that the switch lever is compatible with chair body frames of different sizes and types.

According to the invention of claim 16, not only the switch lever but also the indicator means, which provides the rider with such information as the remnant electricity in the battery and occurrence of some abnormality, is installed on the respective drive wheel, so that the construction is further simplified and the easiness with which the wheels are attached to and detached from the chair body is still further improved.

[THE BEST MODE EMBODIMENT TO PRACTICE THE INVENTION]

Figure 1:
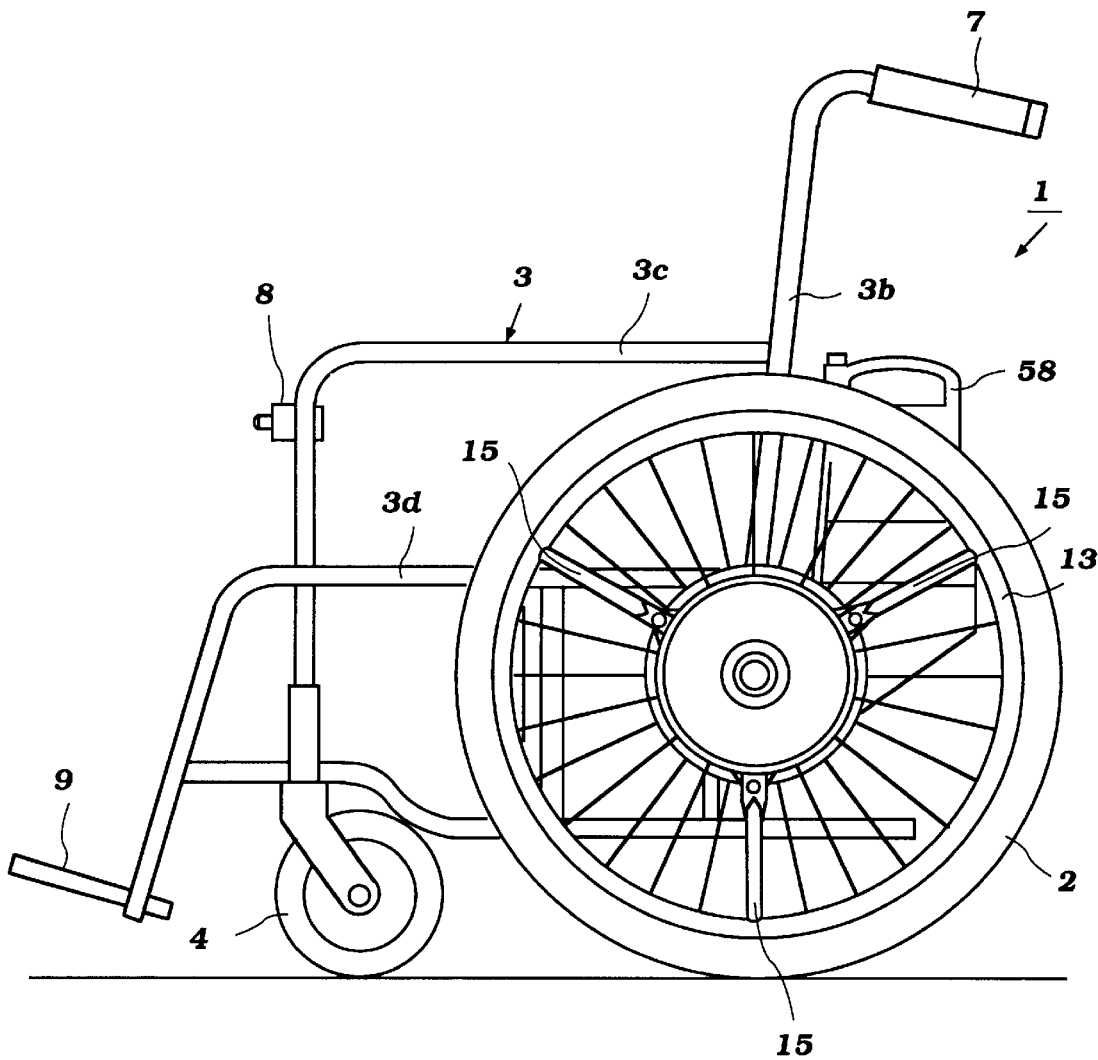
FIG. 1 is a side view of a manual electric wheelchair according to a first embodiment of the invention.

Embodiments of the present invention will be explained with reference to the attached drawings.

<Embodiment 1>

A manual electric wheelchair 1, according to the present embodiment, comprises a chair body of a conventional folding hand-driven wheelchair, to which are detachably attached on each side a wheel 2 as the drive wheel, with the front and the rear parts of a frame 3 of the chair body being supported on a pair of right and left casters 4 and the wheels 2, respectively, in a manner such that the wheelchair 1 can move freely.

Figure 2:
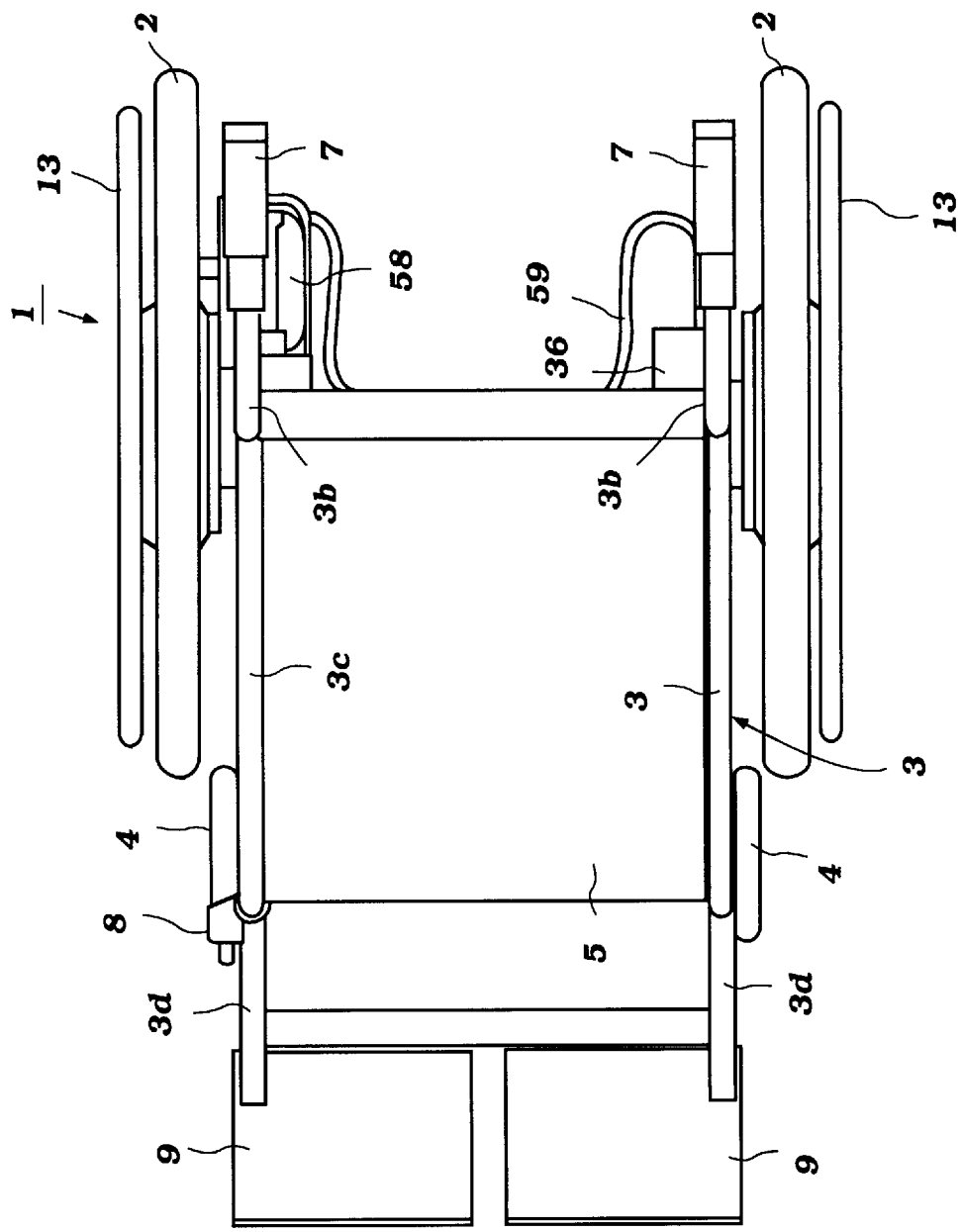
FIG. 2 is a top plan view of the same wheelchair.
Figure 3:
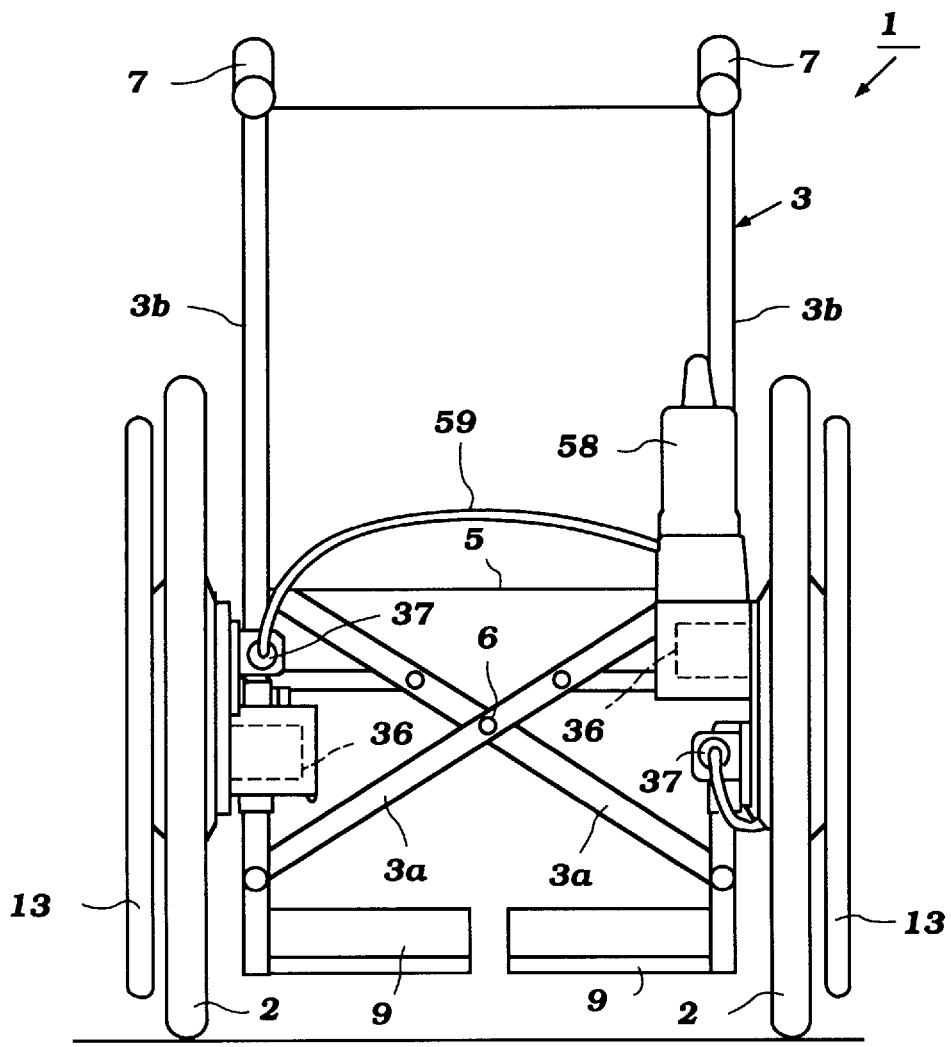
FIG. 3 is a rear view of the same wheelchair.

Horizontally across the frame 3 is stretched a cloth sheet 5 on which a rider sits (ref. FIG. 2 and FIG. 3). Incidentally, the frame 3 includes a pair of front and rear cross members 3a, 3a, as shown in FIG. 3, and these two cross members 3a, 3a, forming a shape like the letter "X", are penetrated by a shaft 6 at the crossing part.

From the rear of the frame 3 extend upwardly a pair of right and left handle arms 3b, 3b, which are bent backwards at the extremities, and each extremity of the arm 3b is provided with a grip 7 for a helper.

Extending forward and horizontally from about the mid-height position of the handle arms 3b of the frame 3 are a pair of right and left arms 3c, which at their foremost positions are bent roundly by about a right angle and extend perpendicularly downward and are supported on the respective casters 4 at the lower extremities in a manner such that the casters 4 are freely pivotal; a main switch 8 is attached to the right arm 3c (right, as seen by the rider sitting on the sheet 5) at a location of the right-angle bent (the top part of the perpendicular portion). A pair of right and left arms 3d are provided below the arms 3c, and are bent downward at the front to extend down with a slant; to the extremities (front ends) of the arms 3c are attached a pair of right and left steps 9.

Figure 5:
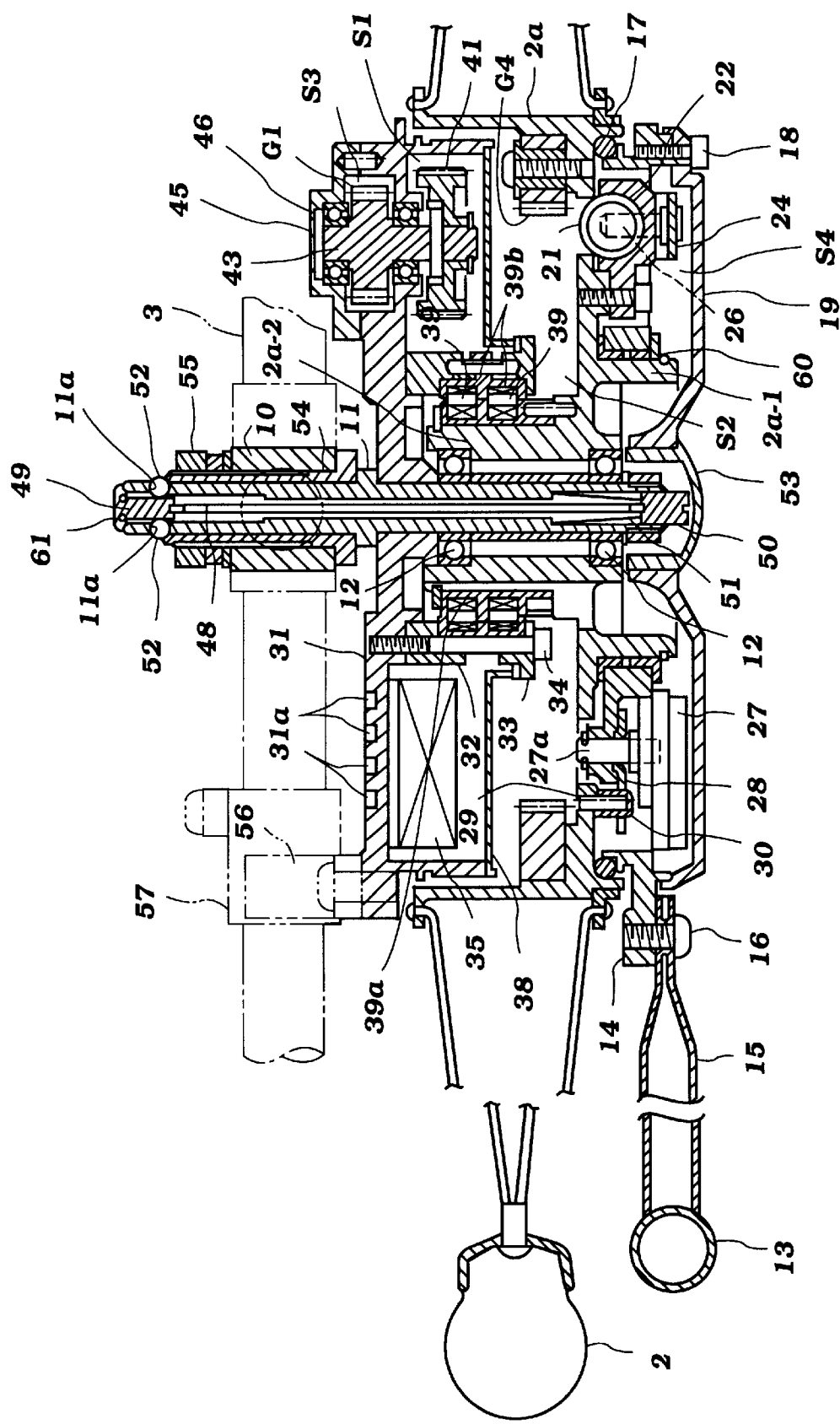
FIG. 5 is a cross-sectional view being taken on the plane of the line A—A of FIG. 4.

Now, each of the right and left wheels 2 is, as shown in FIG. 5, borne by an axle 11 via ball bearing 12 in a manner such that the wheels 2 are freely rotative, and the axle 11 is supported by a axle receivable boss 10, which is welded to the frame 3; a pair of ring-shaped handrims 13 are provided exterior to the respective wheels 2, for the rider to turn with hands. Each handrim 13 has three spokes 15, which are fixed to a round disk 14 by means of bolts 16, and thus the disk 14 supports the handrim 13 and is in turn borne freely rotatively on a boss member 2a-1 via bearing 60; the boss member 2a-1 is integrally formed to a hub 2a of the wheel 2. Thus, the handrims 13 are capable of rotating independently of the wheels 2.

Incidentally, in the present embodiment, as shown in FIG. 5, a seal ring 17 made of an elastic material is interposed between the outer face of the hub 2a of the wheel 2 and the disk 14, and the disk 14 is covered up with a cover 19, which is connected to the outer face (outer, with respect to the width of the wheelchair) of the disk 14 by means of bolts 18. In addition to the sealing performance, the seal ring 17 functions as a friction damper for restricting the circumferential vibration which accompanies the inertia of the handrim 13 and the disk 14.

Figure 4:
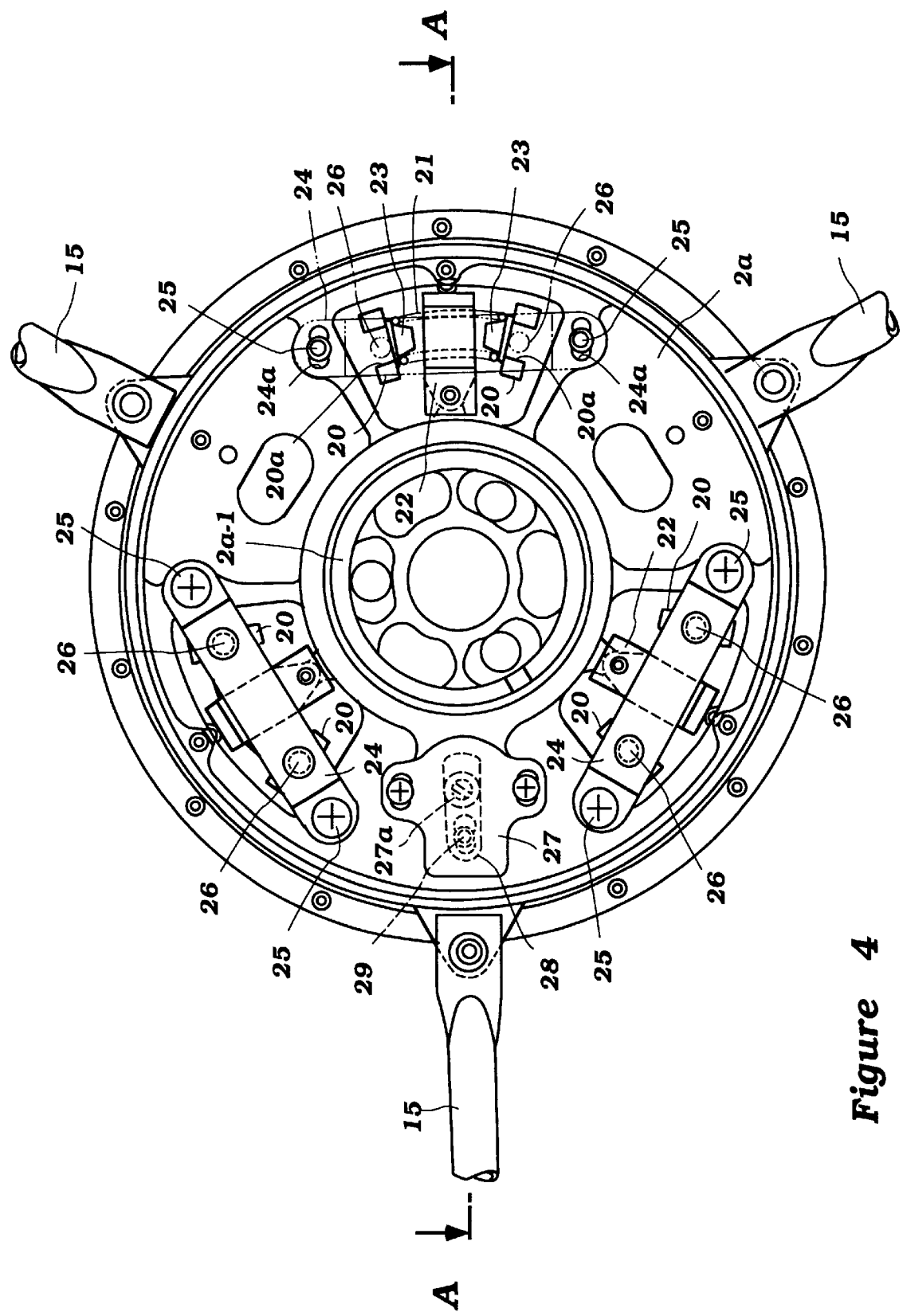
FIG. 4 is front view, illustrating a situation wherein a cover has been removed from a hub of a wheel of the same wheelchair.

Thus, the handrim 13 is elastically connected to the wheel 2 at three equi-spaced positions, which is achieved through a construction as shown in FIG. 4.

Specifically, as shown in FIG. 4, a spring 21 is provided in a space defined between each pair of stoppers 20, 20 formed to the hub 2a of the wheel 2 in a manner such that the space fans out radially; each spring 21 is prevented from falling by virtue of a holder member 22 fixed on the hub 2a.

The ends of each spring 21 are received by spring seats 23, and at the time of a neutral position whereat no human power is imparted to the handrim 13, the spring seats 23 are in contact with the pair of the stoppers 20, as shown in FIG. 4. Incidentally, a penetrating groove 20a is made in the middle of each stopper 20.

Also, as shown in FIG. 4, three brackets 24 are fixed on the disk 24 at equi-spaced positions along the circumference by means of bolts 25 in a manner such that the positions of the brackets 24 are adjustable; a pair of pins 26 are provided at end portions of each bracket 24 to extend inwardly, and each pair of the pins 26 are in contact with end faces of the respective spring seats 23 at the time of a neutral position whereat no human power is imparted to the handrim 13, as shown in FIG. 4.

Incidentally, an elongated hole 24a lengthened radially is formed at either end of each bracket 24, and the bolt 25 is inserted through each elongated hole 24a. Therefore, when the bolts 25 are loosened, the bracket 24 can be shifted radially and thus its position can be adjusted; also, since the end faces of the spring seats 23 (which are disposed to contact the pins 26) are beveled, as shown, so that as of the neutral position, it is possible to adjust the positions of the pins 26 relative to the spring seats 23 by shifting the bracket 24 radially as described above, and consequently, it is possible to cause the pair of the pins 26 to be contacted by the spring seats 23 at the time of the neutral position, as shown in FIG. 4.

Also, as shown in FIG. 4 and FIG. 5, a potentiometer 27 for detecting the magnitude and the direction of the human force imparted to the handrim 13, is fixed to the disk 14 on the side of the handrim 13, in a manner such that its position can be adjusted so as to enable zero point adjustment; one end of a lever 28 is coupled to an end portion of an input shaft 27a of the potentiometer 27, and the other end of the lever 28 has an elongated hole, which is engaged with a pin 29 planted to a hub 2a of the wheel 2, via a rubber cap 30. Incidentally, the cap 30 is provided so as to prevent the lever 28 from tottering.

Now, the spring 21, the potentiometer 27 and others constitute a man power detect means for detecting the man power which is imparted to the handrim 13 by the hands of the rider, and this man power detect means is housed in a room S4 surrounded by the disk 14 and the cover 19 as well as the hub 2a of the wheel 2, which is sealed by means of the seal ring 17.

Figure 6:
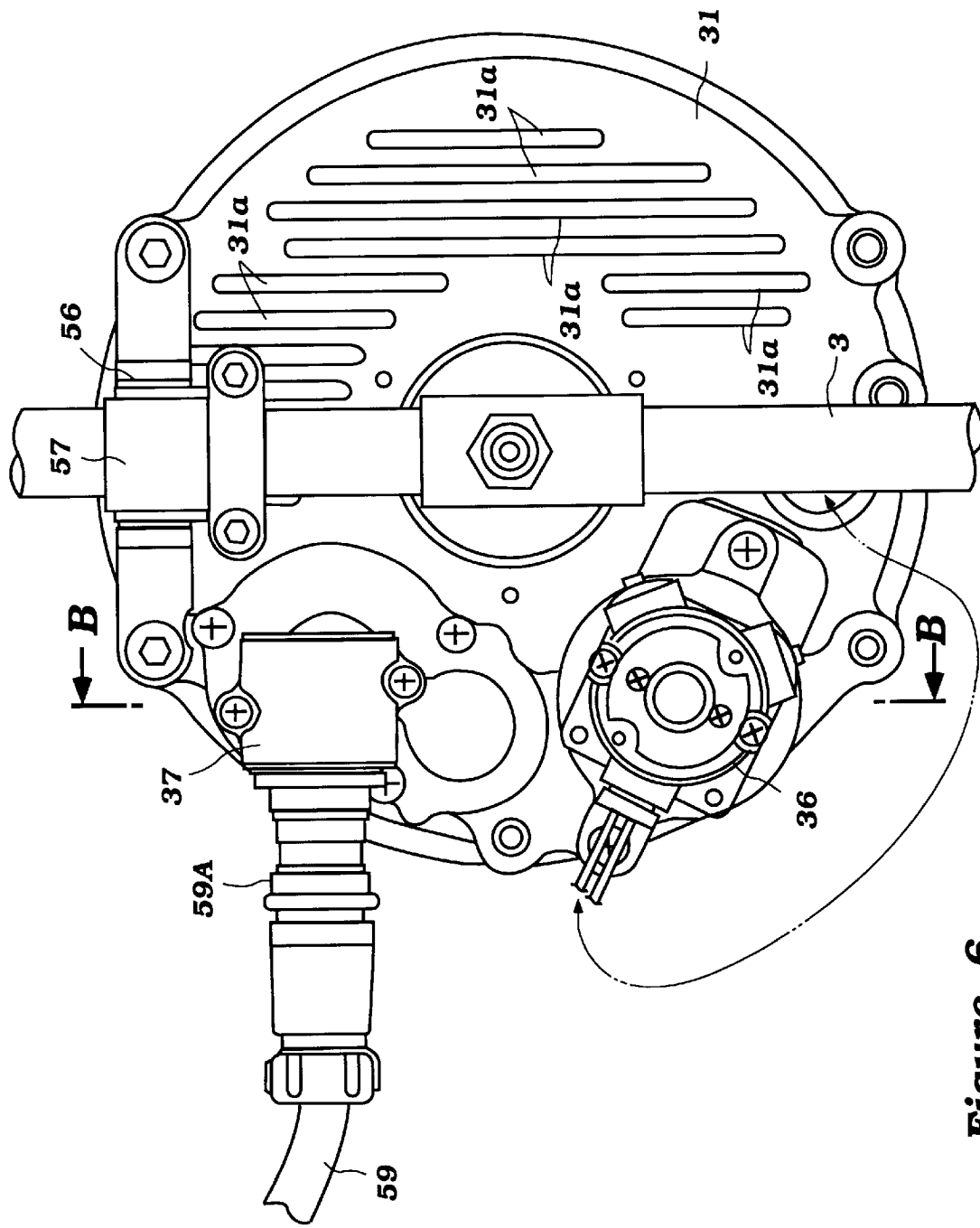
FIG. 6 is a rear view of the hub of the wheel of the wheelchair.
Figure 7:
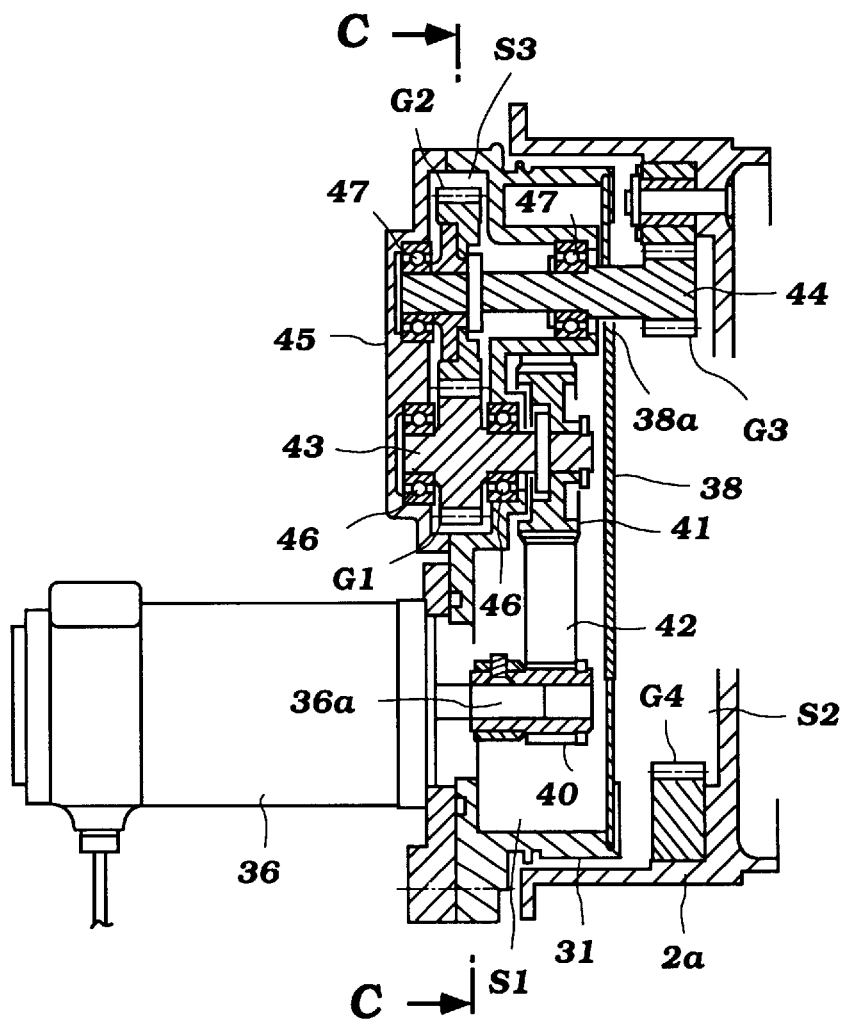
FIG. 7 is a cross-sectional view being taken on the plane of the line B—B of FIG. 6.

On the other hand, as shown in FIG. 5 and FIG. 6, a pair of disk-like stationary plates 31 are fixed to the axle 11 at locations interior to the respective hubs 2a of the right and left pair of wheels—interior meaning closer to the middle point of the line connecting the centers of the wheels 2; a cylindrical retainer member 32 and a ring-like retainer ring 33, which cover the boss portion 2a-a of the hub 2a of each wheel 2, are fixed to that inner face of the stationary plate 31 which is on the side of the hub 2a, by means of bolts 34; also a controller 35 is attached to the same face of the stationary plate 31 to constitute a control means. Furthermore, a drive motor 36 and a wheel side coupler 37 are attached to that outer face of the stationary plate 31 which is on the side of the chair body, as shown in FIG. 6 and FIG. 7. Incidentally, a plurality of vertically extending grooves 31a for heat radiation are formed in the surface of the stationary plate 31 at least over the area on the back side of which is provided the controller 35, as shown in FIG. 5 and FIG. 6.

Now, a space is defined by the stationary plate 31 within the hub 2a of each wheel 2, and this space is divided into rooms S1 and S2 by a ring-like partition wall 38, which is fixed by the stationary plate 31 and the retainer ring 33, and a part of the partition wall 38 is formed with a opening 38a, as shown in FIG. 7. A ring-like inner transformer 39a is s fixed to that boss portion 2a-2 of the hub 2a which is on the rotation side, and an outer transformer 39b is held between that retainer member 32 and that retainer ring 33 which are on the stationary side. The inner transformer 39a and the outer transformer 39b are concentrically disposed and have a slight gap between each other, and constitutes a rotation transformer 39, which is a signal transmit means between the controller 35 and the potentiometer. Incidentally, the controller 35 is housed in the room S1.

Figure 8:
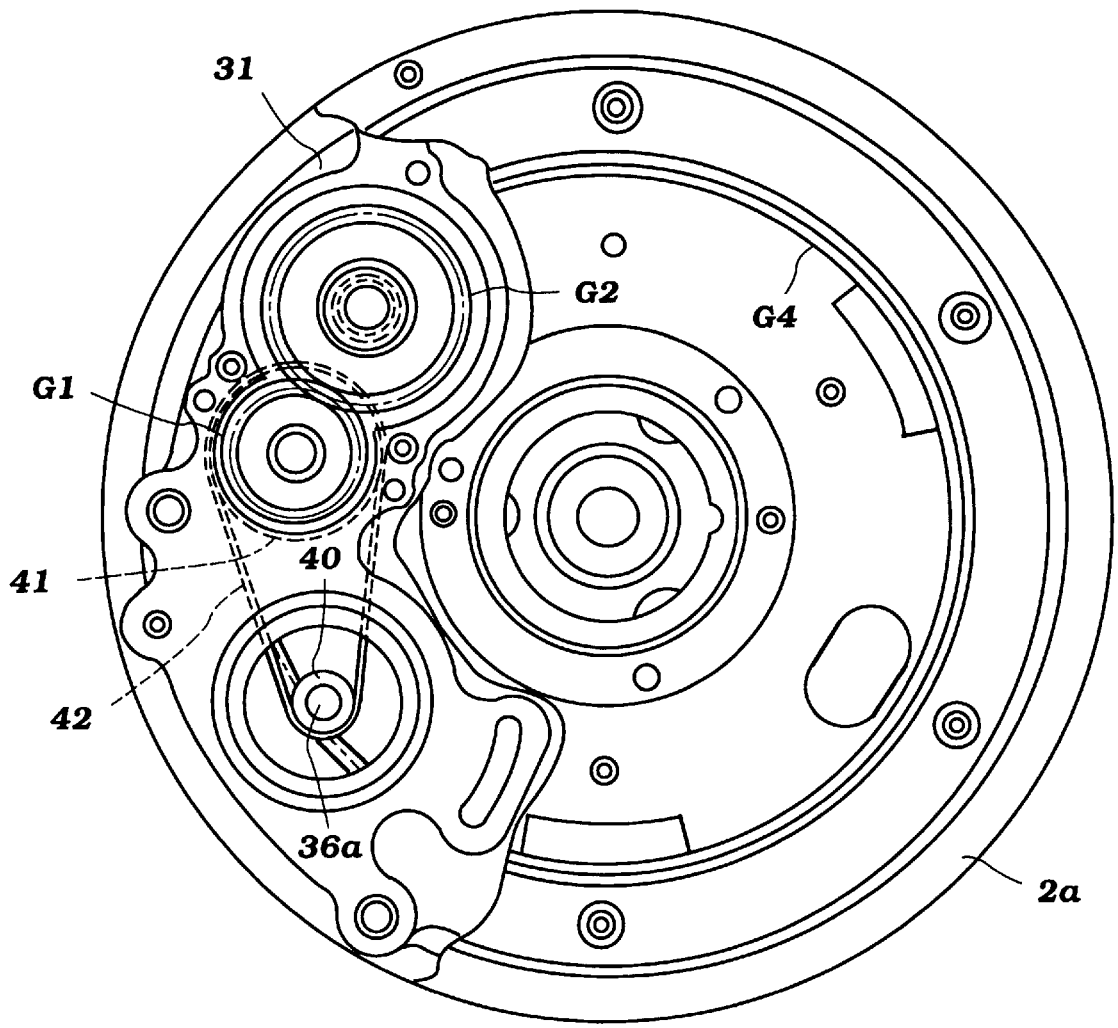
FIG. 8 is a partially cutaway cross-sectional view being taken on the plane of the line C—C of FIG. 7.

Thus, the supplementary drive force created by the drive motor 36 is transmitted to the wheel 2 by way of the drive force transmit means, and the construction of the drive force transmit means will be described hereinbelow with reference to FIG. 7 and FIG. 8.

The drive force transmit means includes pulleys 40, 41, a belt 42, and a number of gears G1–G4, and the small-diameter pulley 40 is locked about an end portion of an output shaft 36a of the drive motor 36, the large-diameter pulley 41 is locked about an end portion of an intermediate shaft 43, and the endless belt 42 is passed round the pulleys 40, 41.

The intermediate shaft 43 and the drive shaft 44, which extends in parallel with the shaft 43, are borne by the stationary plate 31 and the cover 45 via ball bearings 46, 47, respectively, as shown in FIG. 7, in a manner such that the shafts 43, 44 are freely rotative about their axes, and the gear G1 is integrally formed from the intermediate shaft 43, and the gear G1 is meshed with the gear G2, which is locked about one end of the drive shaft 44.

The other end portion of the drive shaft 44 is extended to penetrate the opening 38a made in the partition wall 38 (ref. FIG. 7), and is disposed into the room S2, and the small-diameter gear G3 formed integrally from this other end of the shaft 44 is meshed with the large-diameter ring gear G4, which is attached to the inner circumferential surface of the hub 2a. Incidentally, the pulleys 40, 41 and the belt 42, which constitute the drive force transmit means and the controller 35 are housed in the room S1 partitioned off by the partition wall 38, since they are ill-affected by lubricant; the gears G1 and G2 are housed in the room S3 (ref. FIG. 5 and FIG. 7), and the gears G3 and G4, which need lubricant, are contained in the room S2.

As described above, the supplementary drive force system is constituted by the man power detect means comprising the spring 21 and the potentiometer 27, the signal transmit means comprising the rotation transformer 39, the control means comprising the controller 35, and the drive force transmit means comprising the drive motor 36, the pulleys 40, 41, the belt 42, and the gears G1–G4; this supplementary drive force system is arranged compactly about the axle 11 of the hub 2a of each wheel 2, extending radially as well as axially. A pair of such wheels 2 as this are prepared for right and left sides of the chair body, each wheel 2 having the same construction and equipped with the supplementary drive force system arranged in the hub 2a, and as described above, each wheel 2 is detachably affixed to the chair body.

Next, the structure of the detachability mechanism of the wheel 2 will be explained with reference to FIG. 5.

The axle 11, which bears the wheel 2 in a manner such that the wheel 2 is freely rotative, is formed hollow, and a small-diameter rod 48 is inserted in it. A stopper member 49, which is engaged with the inner end face of the axle 11, is coupled to an inner end of the rod 48, and a press member 50 is coupled to an outer end of the rod 48, and both the stopper member 49 and the press member 50 are fitted in the axle 11 in a manner such that they are freely slidable; the diameters of these members are greater than the diameter of the rod 48. Incidentally, the rod 48, the stopper member 49 and the press member 50 are permanently biased outwardly (downward as seen in FIG. 5) by means of a spring 51. Also, in FIG. 5, a reference numeral 61 designates a cir-clip to constitute a stopper.

The inner end portion of the axle 11 (the portion where the stopper member 49 is fitted) is formed with a plurality of circular holes 11a, and a ball 52 is held in each circular hole 11a. Incidentally, a freely flexible rubber cap 53 is fitted in the central portion of the cover 19 and the press member 50 is disposed inside the rubber cap 53.

On the other hand, a cylindrical sleeve 54 is inserted in the axle receivable boss 10, which is welded to the frame 3, and the sleeve 54 is coupled to the axle receivable boss 10 by means of a nut 55, which is threadably engaged with the outer circumference of the sleeve 54.

Thus, the wheel 2 is attached to the chair body by inserting the inner end portion of the axle 11 into the sleeve 54 from outside, and when the wheel 2 is attached, the balls 52 are pushed radially outward by the stopper member 49, as shown in FIG. 5, and protrude from the outer circumference of the axle 11, so that the balls 52 are hooked on the inner end face of the sleeve 54 and thus the axle 11 is prevented from coming off, and the axle 2 is securely attached to the chair body.

Next, in order to detach the wheel 2 from the chair body, the rubber cap 53, which is used as the operation button for the attachment and detachment of the wheel 2, is pressed with finger so as to shift the press member 50, the rod 48 and the stopper member 49 in one body inwardly with respect to the axle axis, against the bias force of the spring 51. Then, the stopper member 49 retreats from the position of the balls 52, and the small-diameter rod 48 comes at the position of the balls 52, whereupon the balls 52 shift inwardly with respect to the radii of the axle 11 and cease to protrude from the outer circumference of the axle 11, and now it is possible to withdraw the axle 11 from the sleeve 54 by pulling the whole body of the wheel 2 outwardly, and thus it is now possible to detach the wheel 2 in a one-click manner.

In order to attach the wheel 2 to the chair body again, the rubber cap 53, as the operation button, is kept depressed with finger so as to keep the press member 50, the rod 48 and the stopper member 49 to be dislocated inwardly with respect to the axle axis, and while things are so kept, the axle 11 is inserted in the sleeve 54, and then, the finger is removed from the rubber cap 53, whereby the attachment is completed. At this moment, the balls 52 are pressed radially outward by the stopper member 49 and protrude outward from the outer circumference of the axle 11, and thus the axle 11 is prevented from coming off, and it is now possible to attach the wheel 2 to the chair body in a one-click manner.

Incidentally, as shown in FIG. 5 and FIG. 6, a turn-prohibitor member 56, which has a profile like a Japanese letter "ᄀ" and opens internally toward the chair body (in the direction of attaching the wheel 2), is fixed on a peripheral portion of the outer face of the stationary plate 31 of each wheel 2, and a stopper member 57 is fixed to the frame 3, and it is so constructed that simultaneously as the wheel 2 is attached to the chair body in a manner described above, the turn-prohibitor member 56 engages with the stopper member 57 whereby the stationary elements such as the stationary plate 31 are prohibited from turning.

Now, in the manual electric wheelchair 1 of the present embodiment, a battery 58 is detachably attached to the stationary plate 31 of the right-side wheel 2, as shown in FIG. 1 through FIG. 3, and a wire harness 59 is provided to the chair body (frame 3).

Since the right and left wheels 2 have the same construction, these assume a point symmetrical positions with respect to a middle point of the chair body as taken in the direction of front to rear. By arranging the right and left wheels 2 of the same construction in this manner, the drive motors 36, which protrude internally from the respective wheels 2 come at different levels, as shown in FIG. 3, and thus the drive motors 36 do not interfere with each other when the wheelchair 1 is folded, and as a result, it becomes possible to fold the wheelchair 1 compactly and easily. Also by virtue of the fact that the right and left wheels 2 are of the same construction, they can be made up of common parts, and thus it is possible to reduce the cost through the mass production effect.

After the right and left wheels 2 are attached to the chair body in a manner as described above, the coupler 37 connected to the stationary plate 31 of each wheel 2 is coupled to a coupler 59A of the wire harness 59 provided on the chair body side, whereupon electricity is supplied by the battery 58 provided on the right wheel 2 to the drive motor 36, the controller 35, etc. which are provided on the left wheel 2 via the wire harness 59.

Figure 9:
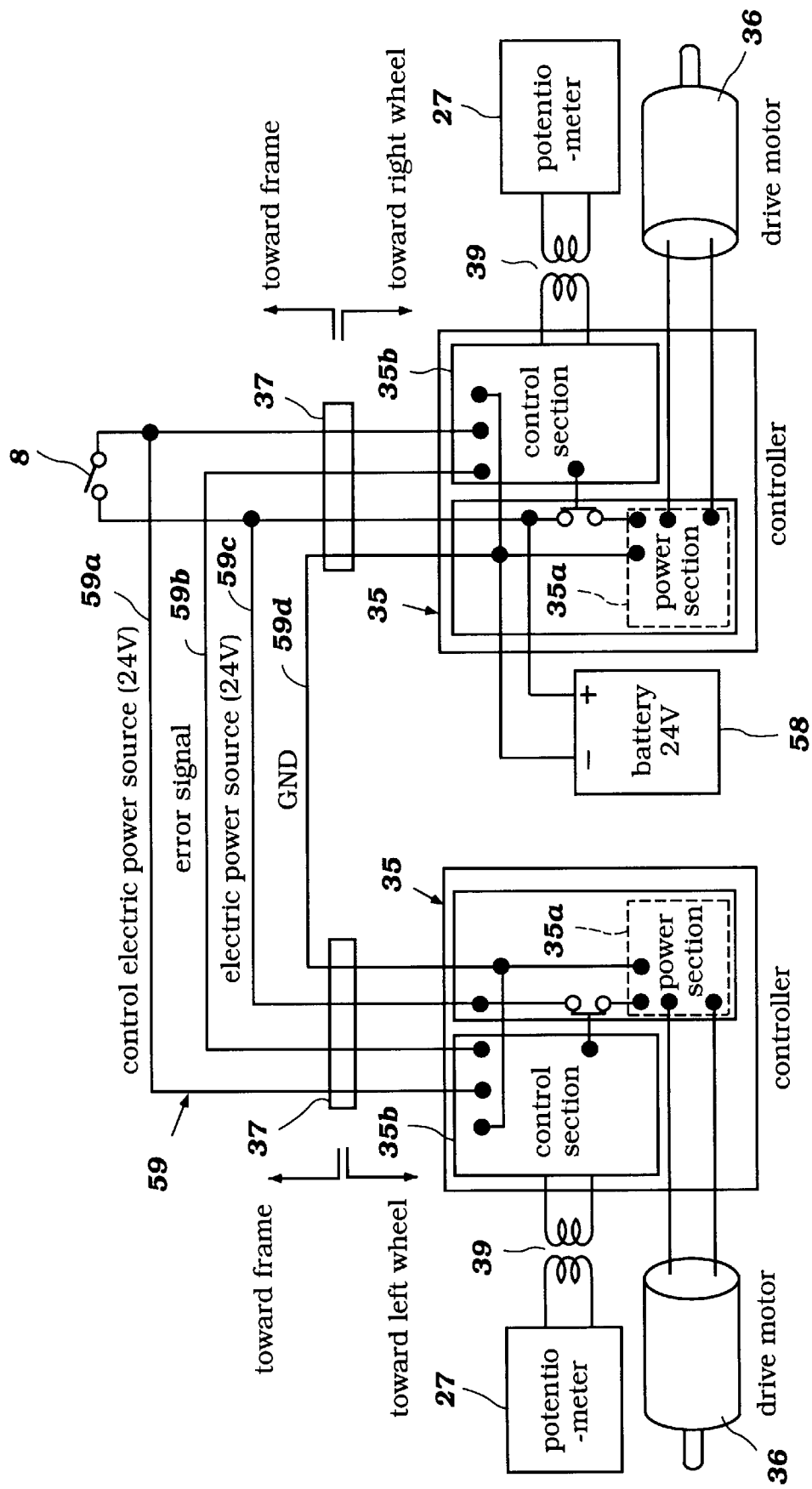
FIG. 9 is a wiring diagram of a supplementary drive force system of the same manual electric wheelchair.

Now, the electric circuit arrangement of the present manual electric wheelchair 1 will be explained with reference to FIG. 9.

As shown, the wire harness 59 provided on the chair body (frame 3) comprises a bundle of four wires, namely, a control electric power source wire 59a, an error signal wire 59b, an electric power source wire 59c and a ground wire 59d, and is connected to a power section 35a and a control section 35b of the controller 35, which is provided on the right wheel 2 as well as the left wheel 2, via the couple 37, which is provided on the right wheel 2 as well as the left wheel 2. Incidentally, in FIG. 9, the reference numeral 8 designates the main switch.

As described above, the battery 58 is provided on the right side wheel 2, and electricity is supplied by the battery 58 to the controller 35 provided on the right side wheel 2 simultaneously as it is supplied to the controller 35 provided on the left side wheel 2 via the wire harness 59. The electric power charged on the power section 35a of each controller 35 is supplied to the drive motor 36 to thereby drive the drive motor 36, and the electric power charged on the control section 35b of each controller 35 is supplied to the potentiometer 27, which belongs to the rotary elements, via a rotation transformer 39, and at the same time, a signal released from the potentiometer 27 is transmitted to the controller 35 via the rotation transformer 39.

Next, the operation of the manual electric wheelchair 1 of this embodiment will be explained.

As the rider imparts forces to the pair of right and left handrims 13 in the direction of advance, for example, certain ones of the pins 26, shown in FIG. 4, are caused to press the spring seats 23 to thereby compress the springs 21, whereupon the reactive force of the springs 21 is transmitted to the hubs 2a of the wheels 2 via the stoppers 20, so that the man force is transmitted to the wheels 2.

The handrims 13 are turned through an angle, relative to the wheels 2, which corresponds to the amount of deformation of the spring 21 due to the compression, and this amount of relative rotation of the handrims 13 is transmitted to the potentiometer 27 after being magnified by means of the lever 28, and then, the potentiometer 27 supplies a detection signal representing the relative rotation amount of the handrims 13 to the control section 35b of the controller 35 via the rotary transformer 39.

Now, since the amount of deformation of the springs 21 due to the compression is proportional to the magnitude of the human force imparted to the handrims 13, the control section 35b of the controller 35 detect the magnitude of the human force imparted to the handrims 13 based on the detection signal, which is proportional to the relative rotation amount of the handrims 13, and supplies a control signal representing the calculated human force to the power section 35a, and then, an electric power (electric current) corresponding to the detected human force (torque) is supplied to the drive motor 36, whereby the drive motor 36 is driven to rotate and create a required supplementary drive force.

When the drive motor 36 is driven, as described above, its rotation is transmitted to the intermediate shaft 43 by way of the pulley 40, the belt 42 and the pulley 41; the rotational speed is reduced to a first level during this transmission. The rotation of the intermediate shaft 43 is then transmitted to the drive shaft 44 by way of the gears G1 and G2, during which the rotational speed is reduced to a second level. Next, the rotation of this drive shaft 44 is transmitted to the wheel 2 by way of the gears G3 and G4, during which the rotational speed is reduced to a third level; consequently, the wheel 2 is driven to rotate with a drive force of a magnitude equivalent to the sum of the human force imparted to the handrim 13 and the supplementary drive force, and thus the wheelchair 1 is caused to advance, and in this way the rider can drive the wheelchair 1 by turning the handrim 13 with a force which is only about a half of the overall drive force.

As described above, in the present embodiment of the invention, the man power detect means comprising the springs 21 and potentiometer 27, the signal transmit means comprising the rotation transformer 39, the control means comprising the controller 35; and the drive force transmit means comprising the drive motor 36, the pulleys 40 and 41, the belt 42 and the gears G1 through G4 are assembled at one place compactly about the hub 2a of each wheel 2 and the axle 11 of the stationary plate 31, so that a compact and rational arrangement of the supplemental drive force system is realized and a reduction in manufacturing cost of the manual electric wheelchair 1 is achieved through simplification of manufacture and assemble work on account of the consequent reduction in number and lengths of the wires. In this embodiment especially, in each wheel 2 the man power detect means, which includes the drive motor 36, the controller 35 (control means) and the potentiometer 27, is arranged in a manner such that some are provided on the stationary plate (stationary side) and others on the hub 2a (rotatory side), so that a more rational arrangement of these was achieved, and it is now possible to secure a high space effectiveness of each wheel 2. Furthermore, in each one of the wheels 2, the drive force transmit means including such elements as the rotation transformer 39, the controller 35, the drive motor 36 and the pulleys 40, 41 is arranged in the radial direction as well, so that it is possible to utilize the room in each wheel 2 more effectively.

Also, according to the present embodiment, the right and left wheels 2, in which the supplemental drive system is compactly arranged, are attachable to and detachable from the wheel body, together with the stationary plate 31 and the axle 11, so that when the manual electric wheelchair 1 is transported or stored, the wheels 2 can be easily removed from the chair body, together with the axle 11, the stationary plate 31 and the supplemental drive system, and, therefore, the portability and storability of the manual electric wheelchair 1 was improved.

What is more, according to the present embodiment of the invention, the battery 58 is provided on one of the wheels 2 (right wheel), and the supply of the electricity from the battery 58 to the other wheel 2 (left wheel) is conducted through the wire harness 59, so that the chair body need only be provided with the main switch 8 and the wire harness 59, and thus the construction of the chair body is simplified.

Besides, according to the present embodiment, the man power detect means, which includes the potentiometer 27, is housed in the room enclosed by the disk 14 and the cover 19 as well as the hub 2a of the wheel 2, which is sealed by means of the seal ring 17, and the space defined by the stationary plate 31 within the hub 2a is divided into rooms S1 and S2 by the partition wall 38, and the control means comprising the controller 35 and the drive force transmit means comprising the pulleys 40, 41 and the belt 42 are housed in the room S1, so that it is possible to prevent water, lubricant, dust, etc. from entering the the man power detect means, the control means and the drive force transmit means which constitute the supplementary drive system, and to secure high operational stability of these.

Furthermore, in the present embodiment, since the hub 2a of the wheel 2, which supports the handrim 13, is made of a material which is capable of being machined with high precision and has a high rigidity, the handrim 13 is supported with a high rigidity and smooth rotation of the handrim 13 is facilitated, and also it is possible for the rider to stably perform the lift-up action.

Also, the handrim 13 is attached to the disk 14, which is supported on the hub 2a of the wheel 2 in a manner such that the disk 14 is freely rotative, and the disk 14 is provided on the external side of the outer wall of the hub 2a, so that it is possible to minimize the offset amount in the direction of the axle (widthwise direction of the wheelchair) between the operation portion and the rotation support portion of the handrims 13; and as the result, it is possible to minimize the sideways play of the handrim 13, which in effect facilitates the operability of the handrim 13 and improves the durability of the bearing 60 of the rotation support portion of the handrim 13.

Furthermore, according to the present embodiment of the invention, the man power detect means, which includes the potentiometer 27, is housed in the highly water-proof and dust-proof room S4 formed between the disk 14 and the external wall face of the hub 2a, so that it is possible to prevent water, dust, etc. from entering the man power detect means, and thus it is possible to secure high stability in the detection precision of the man power detect means. What is more, as described above, besides as a sealing means, the seal ring 17 provided between the disk 14 and the external wall face of the hub 2a functions as a friction damper to restrict the vibration caused by the inertia of the handrim 13 and the disk 14, so that it is possible to avoid creation of error signals which accompany the vibration.

Also, according to the present embodiment, by operating the flexible rubber cap 53 as the operation button for the mechanism of attaching and detaching the wheels 2, it is possible to attach the wheels 2 to the chair body as well as to detach the same therefrom easily in a one-click manner, so that during transportation of the manual electric wheelchair 1, by detaching the wheels 2 from the chair body, the portability and storability of the manual electric wheelchair 1 was improved.

<Embodiment 2>

Figure 10:
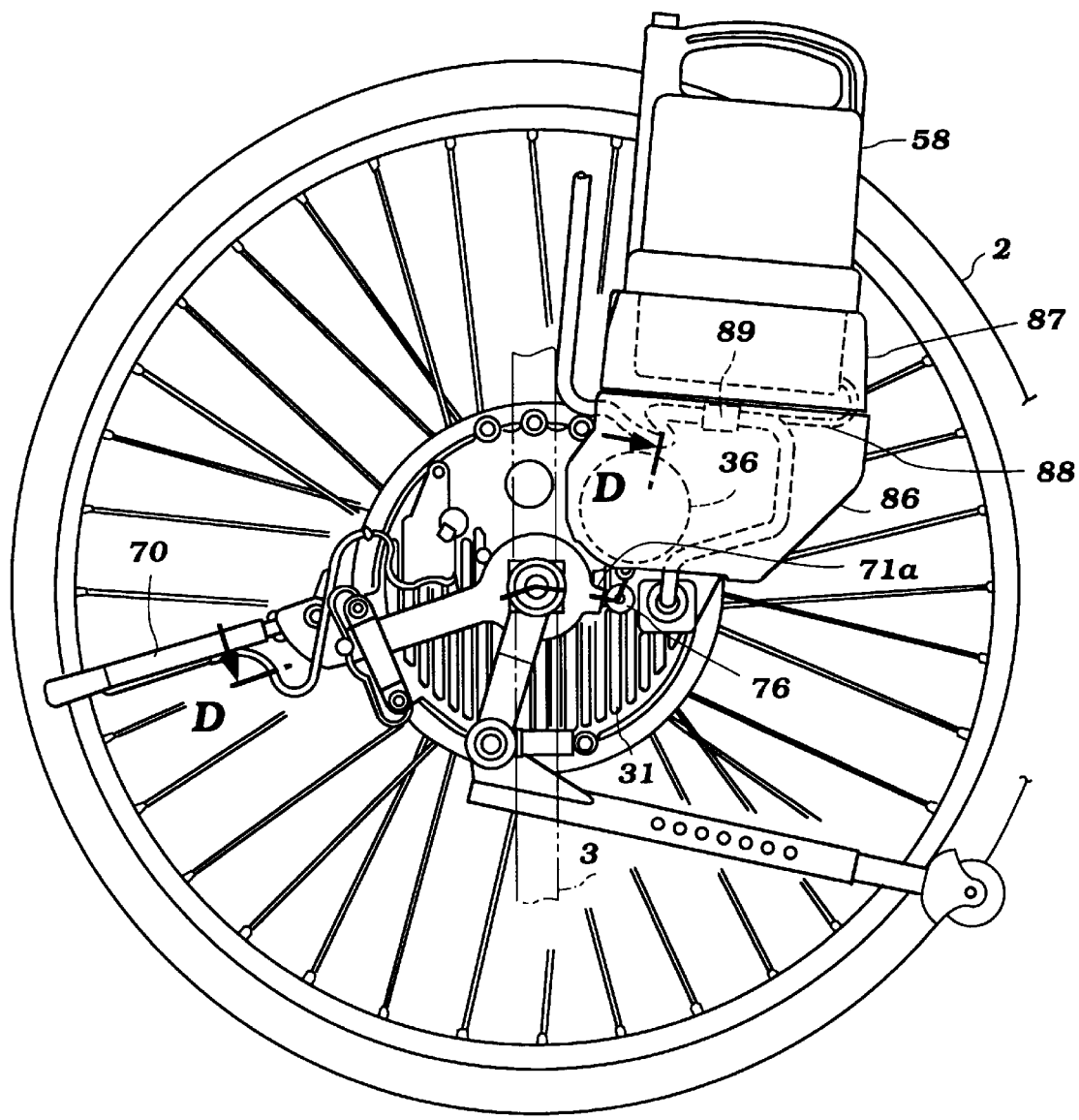
FIG. 10 is a side view of a right wheel of a manual electric wheelchair according to a second embodiment of the invention, as seen from inside the wheels.
Figure 11:
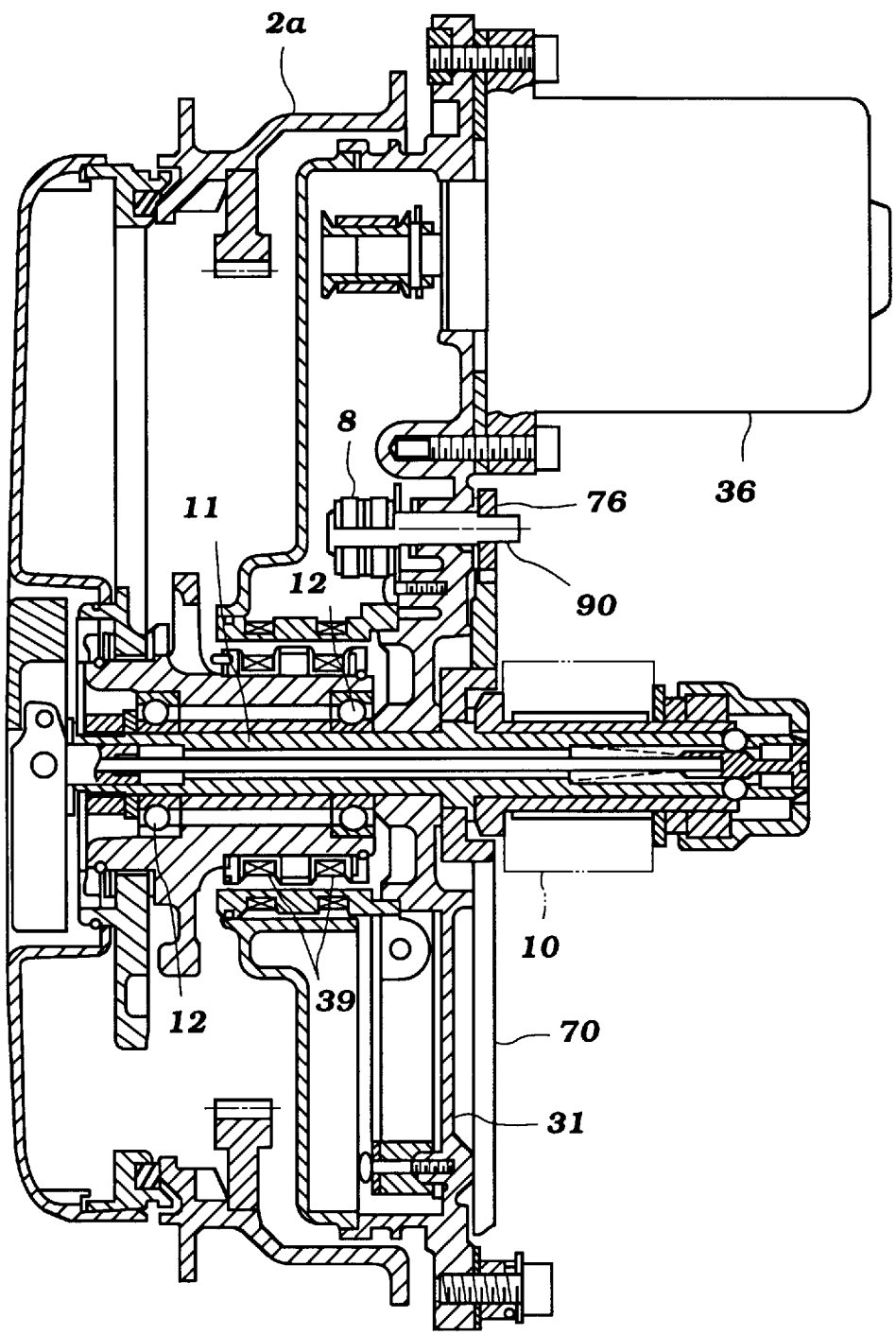
FIG. 11 is an enlarged cross-sectional view being taken on the plane of the line D—D of FIG. 10.
Figure 12:
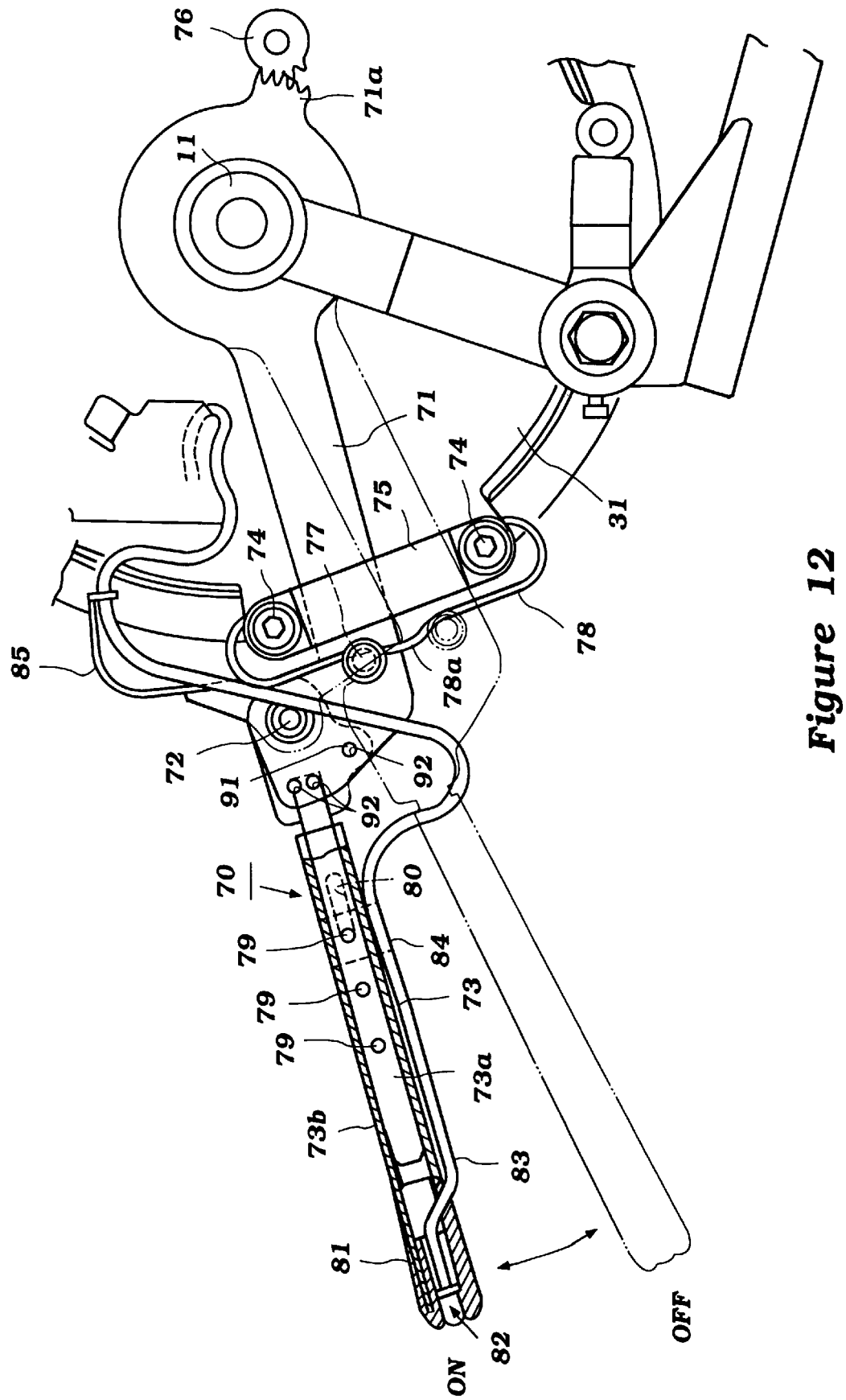
FIG. 12 is an enlarged detailed cross-sectional and broken view of switch lever portion of the right wheel of the same manual electric wheelchair.

Next, a second embodiment of the present invention will be explained with reference to FIG. 10 through 12. Incidentally, FIG. 10 is a side view of a right wheel of a manual electric wheelchair according to the second embodiment of the invention, as seen from inside the wheels; FIG. 11 is an enlarged cross-sectional view being taken on the plane of the line D—D of FIG. 10; and FIG. 12 is an enlarged detailed cross-sectional and broken view of a switch lever portion of the right wheel of the same manual electric wheelchair; in these drawings elements identical to those used in the embodiment 1 are designated with like numerals, and description of such elements are omitted in the explanation of embodiment 2.

In the manual electric wheelchair 1 of the present embodiment, a main switch 8 is built in a hub 2a of a right wheel 2 by being fixed to a stationary plate 31 (ref. FIG. 11), and this main switch 8 is turned on and off when a switch lever 70, shown in FIGS. 10 through 12, is operated to rotate. Now, the construction of the switch lever 70 which be described in detail with reference to FIG. 12.

The switch lever 70 is provided to face the chair body-side face of a stationary plate 31 of the right wheel 2 in a manner such that it is freely rotative, and it consists of a neutral arm 71 and a lever 73, which is connected to the fore end of the neutral arm 71 by means of a bolt 72.

The neutral arm 71 is disposed to penetrate through a tunnel formed by a lever stopper 75, which has a profile like a Japanese letter "コ" and fixed to the stationary plate 31 by means of bolts 74, so that the maximum rotation amount of the neutral arm 71 is limited, and a gear 71a is formed at a part of the base end portion of the neutral arm 71. This gear 71a is meshed with a sector gear 76 for driving the main switch 8 (ref. FIG. 11), and the sector gear 76 is coupled to the main switch 8 via a shaft 90.

Also, a pin 77 is planted at a fore end portion of the neutral arm 71, and this pin 77 is engaged with a guide spring 78 attached to the stationary plate 31. Incidentally, a convex portion 78a is formed at the middle of the guide spring 78 so that the pin 77 must climb over it in order to pass from one side to the other of the guide spring 78.

The lever 73 is composed of a first lever 73a, which is a solid, round rod fixed at the fore end of the neutral arm 71, and a second lever 73b, which is a round pipe sheathing the lever 73 in a manner such that the second lever 73b is freely slidable on the circumferential surface of the first lever 73a, and thus, the lever 73 is capable of having its length and direction adjusted.

The first lever 73a is formed with three screw holes 79 along the length of the first lever 73a at suitable intervals, and the second lever 7b is formed with an axially long hole 80. Thus, it is possible to adjust the length of the lever 73 in the following manner: selecting one of the three screw holes 79 and screwing a bolt into the selected hole 79 past the long hole 80, and then shifting the second lever 73b relative to the first lever 73a within the range of the length of the long hole 80 by way of fine adjustment, and finally tightening the bolt. Also, it is possible to adjust the direction of the lever 73 to three directions in the following manner: turning the whole body of the lever 73 relative to the neutral arm 71 about the bolt 72 after loosening the bolt 72, and thereby causing a pin 91 planted to the lever 73 to engage with one of the three circular holes 92 (the lowest one in the case of FIG. 12) made in the neutral arm 71.

By the way, a knob 81 is provided about the peripheral surface of the fore end of the lever 73 (the second lever 73b), and a pilot lamp 82 consisting of an LED (light-emitting diode) is embedded within the fore end portion of the lever 73. A lead 83, which leads out from the pilot lamp 82 and comes out from the lever 73, is held to the lever 73 or the neutral arm 71 by means of holders 84, 85, with some slackness, and eventually it is electrically connected to a controller, not shown. Incidentally, in the present embodiment, the pilot lamp 82 automatically turns off after it has lighted for a predetermined time after the main switch 8 is turned on, and it starts blinking when the remnant electricity in the battery 58, described later, becomes small, and when the wheelchair 1 comes to a standstill owing to an abnormality, battery death, or some other cause, it blinks to inform the rider of the situation.

When the rider turns the switch lever 70 about the axle 11, this rotation of the switch lever 70 is transmitted to the main switch 8 via the gears 71a and 76, and thereby the main switch 8 is turned on or off. More specifically, when the switch lever 70 is assuming a position shown in solid line in FIG. 12, the main switch 8 is at an ON position, and as the switch lever 70 is turned downward from the ON position to a position shown in two-dot chain line in FIG. 12, the main switch 8 is turned to an OFF position. Incidentally, by virtue of the fact that the pin 77 crosses the convex portion 78a formed to the guide spring 78 as the switch lever 70 is turned, the rider can feel a click as he turns the switch lever 70, and furthermore, the switch lever 70 is maintained either in the solid-line position or the two-dot chain-line position.

In the manual electric wheelchair 1 of this embodiment, a battery 58 is detachably installed on the right wheel 2, as shown in FIG. 10.

More particularly, as shown in FIG. 10, a bracket, not shown, is attached to the stationary plate 31 of the right wheel 2, and a battery holder 87 is fixed on an upper part of this bracket, and the battery 58 is capable of being attached to and detached from this battery holder 87. Incidentally, in FIG. 10, the reference numeral 86 designates a motor cover.

As of the time when the battery 58 is set in the battery holder 87, as shown in FIG. 10, a connection terminal of the battery 58, not shown, is connected to a connection terminal of the battery holder 87, so that when the main switch 8 is turned on through an operation of the switch lever 70, the battery 58 supplies electricity to an electric drive unit provided on each of the right and left wheels 2, via the wire harnesses 88 and 59, whereby each electric drive unit is activated.

Incidentally, as shown in FIG. 12, the wire harnesses 88 and 59 are electrically connected to each other via a coupler 89, and one end of the wire harness 59 is electrically connected to the electric drive unit of the right wheel 2, and the other end of the wire harness 59 is electrically connected to the electric drive unit of the left wheel 2 via a coupler, not shown.

As described above, in this embodiment, the main switch 8 is built in the hub 2a of the right wheel 2, in which the battery 58 is installed, and the switch lever 70, which causes the main switch 8 to turn, is also installed on the right wheel 2, so that the chair body frame 3 is provided only with the wire harness 59, which electrically connect the right and left electric drive units together, and thus the appearance of the manual electric wheelchair 1 is improved and since the quantities of the electric wiring and parts incidental to this can be minimized it is possible to simplify the construction and improve easiness with which the wheels 2 are attached to and detached from the chair body.

Also, in the present embodiment, the switch lever 70 is capable of having its length and direction adjusted, so that it is compatible with many chair body frames 3 of different sizes and types.

Furthermore, according to the present embodiment, not only the main switch 8 and the switch lever 70 but also the pilot lamp 82, which provides the rider with such information as the remnant electricity in the battery 58 and occurrence of some abnormality, is installed on the respective wheel 2, so that the construction is further simplified and the easiness with which the wheels 2 are attached to and detached from the chair body is still further improved.

Incidentally, in the case of the present embodiment the main switch 8 is adapted to rotate by means of the switch lever 70, it is possible to dispense with the switch lever 70 by adopting a construction wherein a push-type main switch is provided at that part of the stationary plate 31 which is externally exposed (a part which the rider can conveniently reach).

[POSSIBILITY OF INDUSTRIAL UTILITY]

As described above, according to the present invention, a compact and rational arrangement of the supplemental drive force system was realized and a reduction in the manufacturing cost was achieved through simplification of manufacture and assemble work on account of the consequent reduction in number and lengths of the wires; furthermore, we could propose a highly portable, storable, as well as mass-producible manual electric wheelchair with which is is possible for the drive wheel to be attached to and detached from the chair body easily.

We claim:

1. A manual powered electric motor assisted wheelchair having a frame providing a seat for a rider, a pair of stationary plate and wheel assemblies detacheably connected to said frame on the opposite sides of said seat, each of said stationary plate and wheel assemblies comprising a respective stationary plate, a drive wheel journalled for rotation by said stationary plate for propelling said wheel chair, a handrim coupled to said drive wheel for manually rotating said drive wheel, a manual power detect means for detecting the manual force applied to said handrim and outputting a detection signal, a control means for receiving said detection signal through a signal transmit means, and a drive motor and transmission for providing a driving assist to said drive wheel, said drive motor being controlled by said control means for creating a supplemental force of a magnitude corresponding to the detected manual power, and means for detacheably affixing said stationary plate to said frame and for holding said stationary plate against rotating.

2. The manual powered electric motor assisted wheelchair as recited in claim 1 further including an axle journaling each drive wheel and affixed to a portion of the respective stationary plate and detacheable from the frame as a unit with the remainder of the stationary plate and wheel assembly.

3. The manual powered electric motor assisted wheelchair as recited in claim 1 characterized by said drive motor and control means are directly supported on said stationary plate and that said manual power detect means is interposed between the handrim and the drive wheel.

4. The manual powered electric motor assisted wheelchair as recited in claim 3 characterized by said stationary plate and said drive motor and control means are provided at locations between the drive wheels, and that said manual power detect means is provided at a location outwardly of the respective drive wheels.

5. The manual powered electric motor assisted wheelchair as recited in claim 3 characterized by that a partition wall is provided around the control means and a portion of said stationary plate.

6. The manual powered electric motor assisted wheelchair as recited in claim 1 characterized by said signal transmit means being provided about an axis of a hub of each drive wheel, and that said control means and said drive motor and said transmission are provided at locations axially inwardly of said signal transmit means.

7. The manual powered electric motor assisted wheelchair as recited in claim 1 characterized by that each stationary plate and wheel assembly has the same construction.

8. The manual powered electric motor assisted wheelchair as recited in claim 1 characterized by that said handrims are supported by hubs of the respective drive wheels for rotation relative thereto.

9. The manual powered electric motor assisted wheelchair as recited in claim 8 characterized by that each one of said handrims is attached to a respective handrim support member supported for relative rotation on the hub of the respective drive wheel and that said handrim support member is provided outside an outer wall of the respective hub.

10. The manual powered electric motor assisted wheelchair as recited in claim 9 characterized by that a resilient member is provided between said handrim support member and an outer wall face of the hub of the respective drive wheel, that a space is defined between the handrim support member and the outer wall face of the respective hub, and that said man power detect means is stored in said defined space.

11. The manual powered electric motor assisted wheelchair as recited in claim 10 characterized by said supporting plate and wheel assemblies are detacheably latched to the frame by a releasable latching mechanism, and further including a cover member is disposed outside the respective handrim support member, a flexible cap member is fitted in a radially central portion of said cover member for operating said releasable latching mechanism.

12. The manual powered electric motor assisted wheelchair as recited in claim 1 characterized by a battery installed on the stationary plate of one of the stationary plate and wheel assemblies, and that supply of electricity from said battery to the drive motor of the other stationary plate and drive wheel assembly is conducted through a wire harness.

13. The manual powered electric motor assisted wheelchair as recited in claim 12 characterized by that a main switch for connecting and disconnecting the electricity supply from said battery to the respective drive motors is integrally built in at least one of the stationary plate and drive wheel assemblies.

14. The manual powered electric motor assisted wheelchair as recited in claim 13 characterized by that a switch lever for operating said main switch is integrally built in at least one of the stationary plate and wheel assemblies together with said main switch.

15. The manual powered electric motor assisted wheelchair as recited in claim 14 characterized by that said switch lever is constructed such that its length and angular position are adjustable.

16. The manual powered electric motor assisted wheelchair as recited in claim 14 characterized by that an indicator means is provided at the forward end portion of said switch lever.

* * * * *